United States Patent [19]

Camras

[11] 4,032,985
[45] June 28, 1977

[54] VIDEO TRANSDUCER SYSTEM AND METHOD WITH TAPE DRAG BETWEEN THE REEL AND THE CAPSTAN

[75] Inventor: Marvin Camras, Glencoe, Ill.

[73] Assignee: IIT Research Institute, Chicago, Ill.

[22] Filed: Dec. 17, 1974

[21] Appl. No.: 533,485

Related U.S. Application Data

[63] Continuation-in-part of Ser. No. 346,869, April 2, 1973, which is a continuation-in-part of Ser. No. 282,275, Aug. 21, 1972, Pat. No. 3,849,797.

[52] U.S. Cl. ............................... 360/93; 242/75.2; 242/197; 360/130
[51] Int. Cl.² ................... G11B 15/43; G11B 15/60; G11B 23/04
[58] Field of Search ............... 360/93, 130, 132; 242/55.19 A, 189, 75.2, 75.43, 75.45; 226/195, 39

[56] References Cited

UNITED STATES PATENTS

| | | |
|---|---|---|
| 3,341,143 | 9/1967 | Nieland et al. ............ 242/55.19 A |
| 3,471,096 | 10/1969 | Hancock ................... 242/55.19 A |
| 3,572,568 | 3/1971 | Lutz ........................ 242/55.19 A |
| 3,580,453 | 5/1971 | Schoeneman ................. 226/195 |
| 3,743,157 | 7/1973 | Mason ........................ 226/195 |
| 3,752,379 | 8/1973 | Di Padova ................... 360/132 |

Primary Examiner—Alfred H. Eddleman
Attorney, Agent, or Firm—Hill, Gross, Simpson, Van Santen, Steadman, Chiara & Simpson

[57] ABSTRACT

A video tape cartridge of endless loop configuration capable of tape speeds suitable for longitudinal scan television recording while providing one hour or more of continuous playing time on one-quarter inch width tape. In an illustrative embodiment tape guides within the cartridge are shiftable from a loading position to an operating position without a substantial change in the length of the tape path to accommodate scanning of the tape at a tensioned loop closely adjacent the capstan. In operating condition, the tape is engaged with the capstan at one side thereof so that the capstan pulls tape along an incoming tape path from the inner side of the coil, the tape passing about the tensioned loop past the transducer head and again engaging the capstan for supply of the tape to the outer side of the coil along an outgoing tape path, with a tape drag applying a substantial drag force to the tape at the incoming tape path between the reel and the capstan.

9 Claims, 9 Drawing Figures

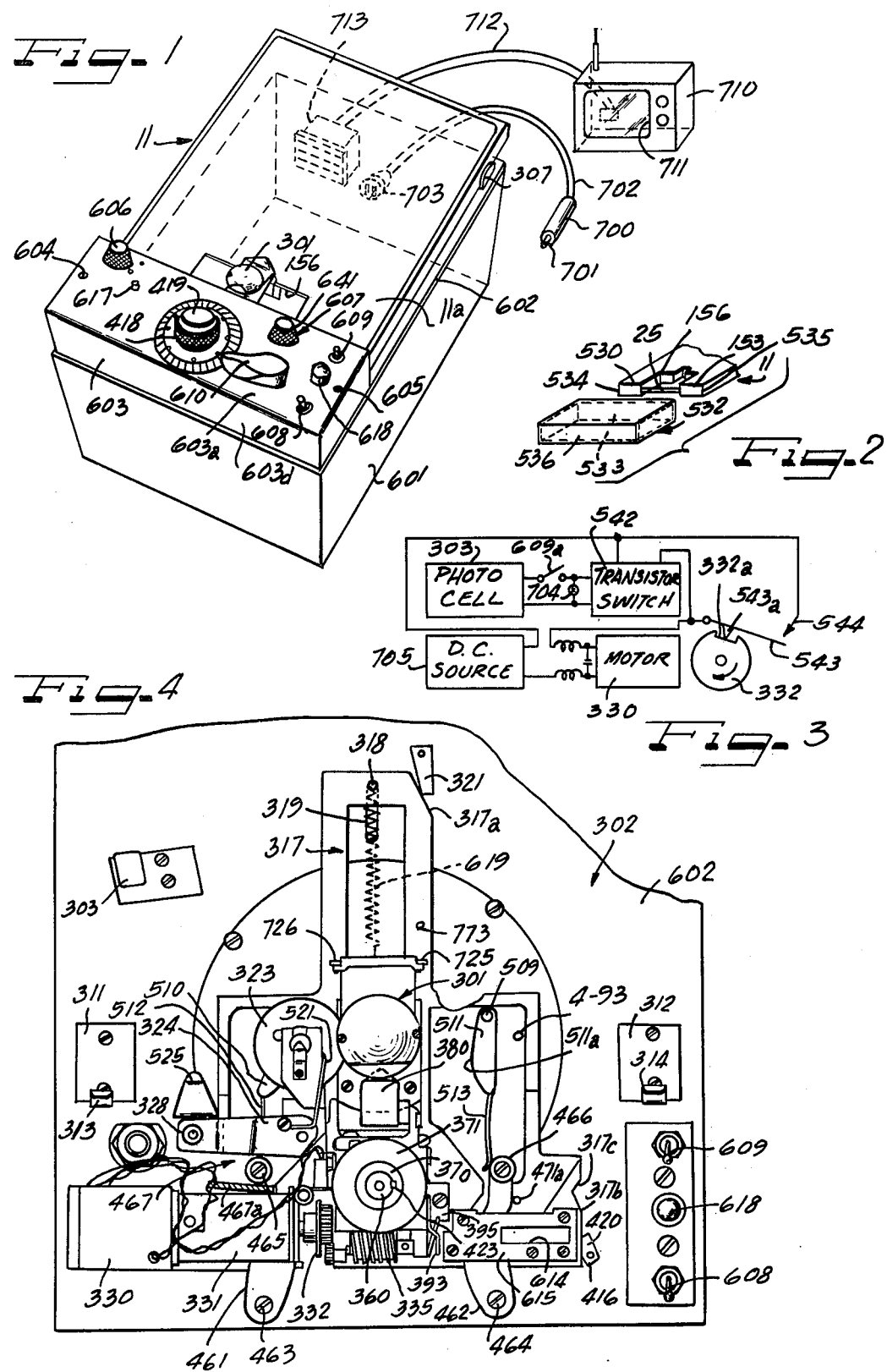

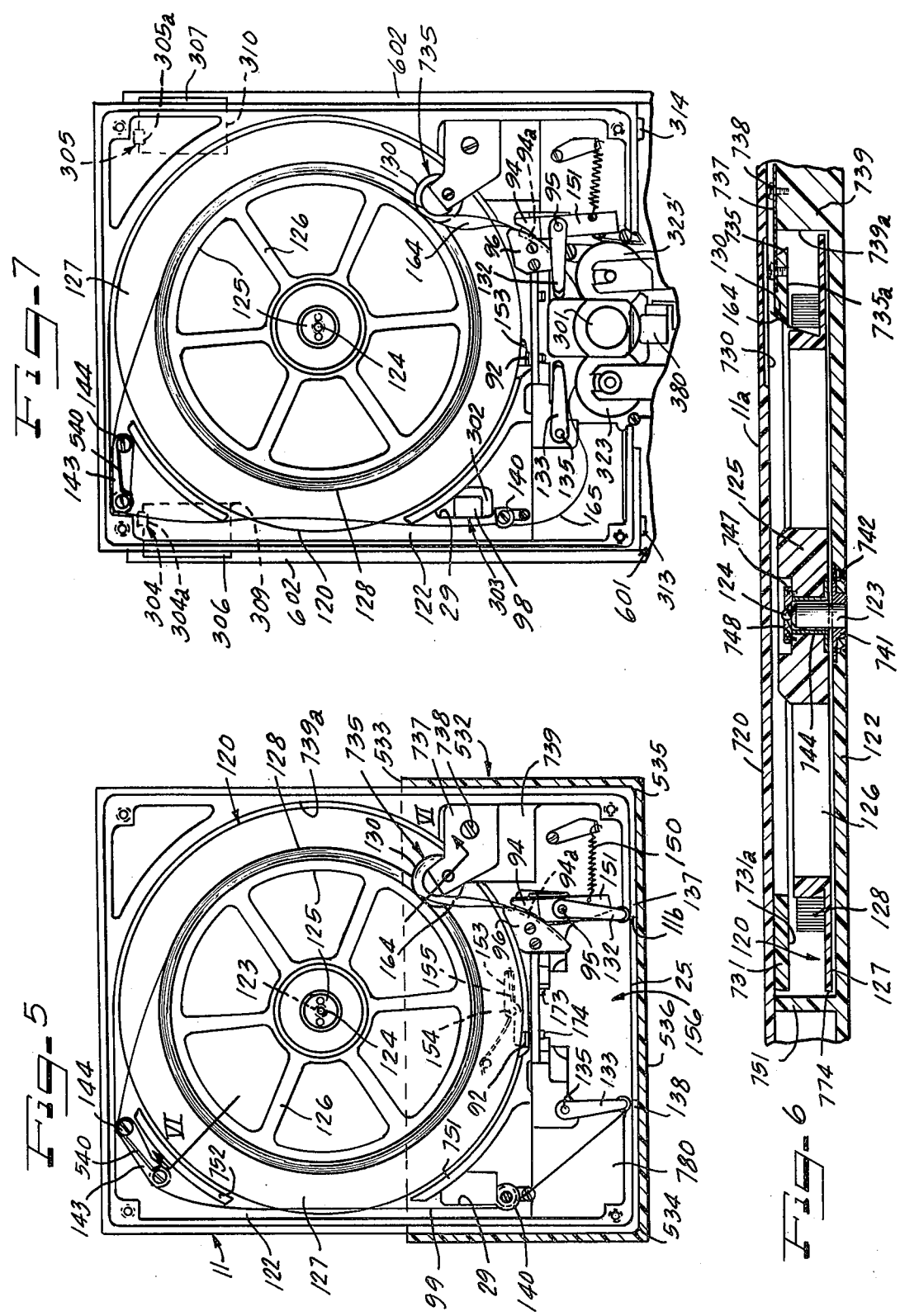

VIDEO TRANSDUCER SYSTEM AND METHOD WITH TAPE DRAG BETWEEN THE REEL AND THE CAPSTAN

CROSS-REFERENCES TO RELATED APPLICATIONS

The present application is a continuation-in-part application based on my pending application U.S. Ser No. 346,869 filed Apr. 2, 1973; said application Ser. No. 346,869 was filed as a continuation in part of my application U.S. Ser. No. 282,275 filed Aug. 21, 1972 (now U.S. Pat. No. 3,849,797 issued Nov. 19, 1974.)

Reference is made pursuant to 35 U.S.C. 120 to the aforementioned applications.

SUMMARY OF THE INVENTION

This invention relates to an endless loop cartridge transducer system including a capstan drive for pulling tape along an incoming tape path extending from an inner side of a coil of record tape to the capstan drive and for supplying tape to the outer side of the coil along an outgoing tape path extending from the capstan drive and establishing a relatively isolated tape loop adjacent the capstan drive where the tape motion is relatively steady, a transducer head for scanning cooperation with the record tape at said isolated tape loop, and a tape drag for supplying a substantial drag force to the tape at said incoming tape path so as to produce a substantial tape tension at the input side of said capstan prior to engagement of the tape with said drive, the constant friction supplied by the tape drag tending to swamp out any irregularities in tape motion, for example due to variations in the friction exerted by the coil as the tape is unwound from the inner side thereof, and being important guiding of the tape over the capstan and head.

Other objects, features and advantages of the invention will be readily apparent from the following description of certain perferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a somewhat diagrammatic perspective view showing a tape transport with an endless loop cartridge in accordance with the present invention in operating position thereon;

FIG. 2 is a somewhat diagrammatic fragmentary perspective view showing a cover for sliding engagement with the end of the cartridge of FIG. 1 for the purpose of completely enclosing the tape when not in use;

FIG. 3 is a diagrammatic illustration of an electric circuit for controlling the gradual shifting of the head from one channel to the next in response to a signal from a photocell or from the manual switch of FIG. 1;

FIG. 4 is a fragmentary somewhat diagrammatic plan view of the tape transport of FIG. 1, but with the cover enclosing operating components of the transport mechanism being removed, the parts of the mechanism being in the operating position, even though the cartridge is entirely omitted ;

FIG. 5 is a somewhat diagrammatic plan view of the cartridge of FIG. 1, but with the cover plate removed to show internal construction;

FIG. 6 is a partial vertical sectional view of the cartridge of FIG. 5, taken generally along the line VI-VI of FIG. 5;

FIG. 7 is a partial somewhat diagrammatic plan view showing the cartridge of FIG. 5 in operating relation to cooperating parts of the tape transport of FIG. 4.

DESCRIPTION OF THE PREFERRED EMBODIMENTS

FIGS. 1 and 2 of the present application are taken from the sixth sheet of drawings of the pending application Ser. 282,275, while FIGS. 3 and 4 are taken from the fifth sheet of drawings of said pending application, FIGS. 5 and 7 from the second sheet, and FIG. 6 from the eighth sheet.

Description of FIGS. 1-4

So as to facilitate a correlation of FIGS. 1 through 4 with the prior disclosure of my U.S. Pat. No. 3,849,797, the same reference numerals will be utilized as in the prior disclosure.

FIG. 1 shows a box-like housing 601 for supporting a base plate 602 and for enclosing the portions of the transport apparatus below the base plate. In the illustrated embodiment base plate 602 supports pads (not shown) which have elements such as 307 for accommodating pivotal loading of cartridge 11 onto the cartridge support 302, FIG. 4. The cartridge support 302 includes a photocell assembly 303, FIG. 4, and pads 311 and 312 having upper surfaces in a common plane with the pads at the rear of the support 302 so as to provide level support for the cartridge 11. Spring fingers 313 and 314 are located at the forward edges of the pads 311 and 312 so that as the cartridge is pivoted downwardly into the operating position, spring fingers 313 and 314 insure the interlocking of the cartridge with overhanging fingers 304a, 305a, FIG. 7 (not shown in FIG. 4) at the rear of the cartridge support.

Referring to FIG. 2, it will be observed that the cartridge 11 has a run of tape at a tape path section 25 which spans an aperture in the cartridge generally indicated at 156. The aperture 156 is of a configuration to receive a capstan drive assembly 301, FIGS. 1 and 4, within the confines of the cartridge and at the inner side of the tape path section 25.

A slide plate or head cartridge 317, FIG. 4, includes a pin 318 sliding within an elongated slot 319 as the slide plate is reciprocated from the loading position to the operating position as shown in FIG. 4. Slide plate 317 is provided with a cam edge 317a for actuating a microswitch arm 321 to start the capstan drive motor of capstan drive assembly 301 as the slide plate 317 reaches the operating position. Capstan pressure rollers such as indicated at 323, FIG. 4, are mounted for pivotal movement by means of linkage arms such at indicated at 324, FIG. 4, which are mounted on fixed pivots such as indicated at 328 carried by the support 302 clear of the path of movement of the slide plate 317.

Referring to FIG. 4, a drive motor 330 is arranged to actuate a head indexing mechanism through a reducing gear section 331, a control cam 332 and worm 335 which serves to drive a worm wheel (not shown) mounted coaxially with the head indexing mechanism 337. The worm wheel is secured to a shaft 352, and the shaft 352 is in turn drivingly coupled with sleeve 360 and sleeve 370 of a cam member 371. The coupling is of a ratchet type so that the cam member 371 may be directly rotated by means of manually knob 418, FIG.

1, without rotation of the worm 335. On the other hand, as worm 335 is driven from motor 330, the cam member 371 and the indicator knob 418 are both rotated therewith. Thus, head 380 may be advanced automatically for scanning relation with successive channels of the tape of cartridge 11 by means of the motor 330, or the head may be set at any desired channel by manual rotation of the knob 418, FIG. 1.

In a preferred embodiment of tape transport, a brake is automatically applied to the flywheel of the capstan drive assembly 301 as the slide plate 317 is retracted to the loading position. Preferably a spring (not shown) automatically applies the braking force when released by means of actuating shaft 416 shown at the lower right in FIG. 4 which extends through support 302. An actuating finger 420 is secured to shaft 416 and allows the brake to be applied when arm 420 comes into registration with notch 317c in the edge 317b of slide plate 317. Correspondingly, the brake is automatically released as the slide plate 317 moves from the loading to the operating position shown in FIG. 4. Thus, the capstan of the capstan drive assembly 301 is rapidly brought to a stop as the slide plate 317 is retracted to the loading position.

Referring to the head indexing mechanism, a knob part 419, FIG. 1, is preferably secured against axial movement by means of a washer (not shown) secured to the end of shaft 352, FIG. 4, and overlying an interior ledge of knob part 419. Knob part 419 is rotatable relative to knob part 418 so as to provide a fine vertical adjustment of the head 380 in relation to the magnetic tape of the cartridge 11. The knob part 419 acts on sleeve 370 so as to shift this sleeve relatively to the inner sleeve 360, a key 423, FIG. 4, being provided between the sleeves 360 and 370 to accommodate such relative vertical movement while requiring conjoint rotational movement of the sleeves 360 and 370. Main knob 418 is secured with the cam sleeve 370 by means of a set screw.

In the automatic mode of channel changing, the de-energized positions of the motor 330 are accurately determined by the notch 332a, FIG. 3, of cam 332. The maximum variation in stopping position of the cam 332 is less than the angular extent of notch 332a. In actual operation, the stopping position of the motor 330 is consistent to within a degree or so, giving rise to a maximum possible variation of less 0.6 mil, a variation which would not be noticeable in a picture as reproduced by the head 380.

Referring to FIGS. 1 and 2, the aperture 156 is of sufficient lateral extent so as to accommodate pressure rollers such as 323, FIG. 4, at each of the opposite sides of the capstan drive assembly 301. These pressure rollers serve to wrap the tape section 25 about the capstan drive assembly 301 and to press the tape into driving engagement with the capstan at each of the lateral slides of the capstan drive assembly 301. The means for positioning the capstan drive roller such as 323 within the cartridge 11 as the slide 317 is moved to the operating position includes cam arms 461 and 462, FIG. 4, mounted on pivot pins 463 and 464. The arms 461 and 462 are rotated clockwise and counterclockwise, respectively, by means of pins such as indicated at 471a carried by the shiftable plate 317. A bracket is diagrammatically indicated at 467 fixedly secured to linkage arm 324 and cooperating with a roller 465 carried at the free end of cam arm 461. The roller 465 is confined between a side wall 467a and an edge of the linkage arm 324 so that as the arm 461 is actuated in the clockwise direction by movement of slide plate 317 to the operating position, arm 324 is swung in a counterclockwise direction about its pivot 328 so as to occupy the position shown in FIG. 4. Similarly a roller 466 mounted on the free end of cam arm 462 is swung in the counterclockwise direction to move a right hand pressure roller (not shown) into a position at the right hand side of capstan drive assembly 301 corresponding to the position of pressure roller 323 at the left hand side of the capstan drive assembly. The right hand pressure roller and associated mounting parts have been omitted in FIG. 4 so as to show the cooperation between arm 462 and other parts of the mechanism. In particular pivot arms 510 and 511 are pivotally mounted on the slide plate 317 by means of pins such as indicated at 509. The pivot arms 510 and 511 are provided with guide faces such as 511a arranged for engagement with portions of the linkage arms carrying the pressure rollers such as 323. Wire springs 512 and 513 are arranged so as to be actuated by the arms 461 and 462 at portions thereof just below the respectively rollers 465 and 466 as specifically shown for the arm 462 and spring 513 in FIG. 4. Thus, as the carriage plate 317 is advanced to the operating position, pins such as 471a coact with cam surfaces of the cam arms so as to pivot the cam arms 461 and 462 clockwise and counterclockwise, respectively. Thus, as the pressure rollers such as 323 approach the operating positions such as that indicated for roller 323 in FIG. 4, arms 461 and 462 begin exerting inward pressure on the respective wire springs 512 and 513 so as to press rollers toward the capstan of capstan drive assembly 301 with the correct degree of pressure.

Conversely as slide plate 317 is retracted from the operating position shown in FIG. 4, pins such as 471a are retracted so as to ride along the cam surfaces, the wire springs 512 and 513 tending to urge the cam arms 461 and 462 in the counterclockwise and clockwise directions respectively as permitted by the pins such as 471a. The cam arms are also urged toward their initial positions because of torsion coil springs (not shown).

Wire springs such as indicated at 521, FIG. 4, act on the linkage arm parts such as 324 in such a way that the linkage arms assume "collapsed" configurations as the slide plate 317 is retracted to the loading position. These wire springs such as 521 also insure that the pressure rollers such as 323 will be properly guided by means of the guide faces such as 511a as the slide is moved to the operating position.

As indicated for the linkage arm 324, a flange strip such as indicated at 525 may be mounted so as to overlie the front edge of the cartridge 11 in operating position of the mechanism, so as to prevent any attempt to remove the cartridge prior to returning the mechanism to the load condition.

CARTRIDGE FEATURE — FIG. 2

FIG. 2 shows the cartridge 11 with the aperture 156 therein for receiving the capstan drive assembly 301 as the cartridge is pivoted downwardly into the operating position. The aperture 156 is further of a size to receive the capstan pressure rollers such as 323 which are advanced into the aperture 156 as slide 317 moves to the operating position. In the operating position, the strips such as 525, FIG. 4, carried on the linkage arms such as 324, overlie regions such as indicated at 530 and 531 of cartridge 11 to prevent any attempt at removing the cartridge from the machine so long as the machine remains in the operating position represented in FIG. 4. When, however, slide plate 317 is retracted to the loading position, the strips such as 525 are pivoted about the pivot axis such as 328 to positions where the strips are entirely clear of the cartridge 11 and of the tape path indicated at 25 at the front of the cartridge.

Once the cartridge 11 has been removed from the machine, a suitable cover such as indicated at 532 in FIG. 2 may be slipped over the front end of the cartridge so as to completely cover any apertures therein such as the one receiving photocell 303 and such as aperture 156, and thus render the cartridge dust proof and fully protect the tape at path section 25 of the cartridge. By way of example, the interior walls forming the left and right sides and top and bottom of the open space within cover 532 may engage the corresponding faces of cartridge 11 such that the cover 532 is frictionally retained in assembly with the cartridge 11 against any inadvertent separation, but the frictional retaining forces being such that the cover 532 can be readily manually removed from the end of the cartridge 11 when it is desired to mount the cartridge in the machine. Thus, the open end 533 of cover 532 provides an opening with a cross section so as to relatively freely accommodate insertion of the end of cartridge 11. The edges of the cartridge such as indicated at 534 and 535 may be sufficiently rounded so as to facilitate insertion of the end of the cartridge into the opening 533. The top and bottom and side walls of cover 532 and end wall 536 are completely solid and free of apertures therethrough so as to provide an effective dust cover for the cartridge 11, which cover enclosed and seals apertures such as 29, FIG. 5, and 156. The top and bottom edges of the cartridge 11 may also be sufficiently rounded so as to facilitate insertion of the cartridge into the open end 533 of the cover 532.

AUTOMATIC INDEXING — FIG. 3

In the illustrated embodiment, the tape of the cartridge may be provided with a reflective strip for actuation of photocell assembly 303. Each actuation of the photocell assembly 303 serves to close an energizing circuit for motor 330. The motor rotates a drive train including worm 335, FIG. 4, which in turn progressively moves the head 380 in a vertical direction. This motor energizing circuit is under the control of a switch operated by cam 332 which is included in the drive train, so that the motor 330 is de-energized at a precisely determined position of the head 380 corresponding to the next channel on the tape. The cam 332 is provided with a notch 332a controlling opening of the electric switch, and the notch has a sufficient angular extent, for example 30°, so that the drive train will come to a stop while the cam actuating the switch is still in registry with the notch of the cam wheel 332. This prevents the inherent momentum of the drive train from reclosing the switch and re-energizing the motor 330. The speed of the motor 330 and the reduction ratio of the drive train to the head is such that the vertical indexing movement of the head between successive channels takes place over an interval corresponding to a substantial distance of travel of the tape, the gradual transition between successive channels as scanned by the magnetic head being illustrated in the ninth figure of my U.S. Pat. No. 2,857,164. An exemplary electric circuit is shown in FIG. 3 wherein the photocell circuit 303 may include a suitable monostable drive for electronic switch 542 such that each actuation of photocell 303 maintains switch 542 conductive for a sufficient time interval to ensure that motor 330 has driven cam 332 a sufficient angular distance so as to close contacts 543 and 544. The electronic switch 542 may also be a monostable circuit with an on time such that the switch 542 will be non-conducting before notch 332a of cam 332 again comes into registry with follower 543a. Then, as soon as notch 332a again registers with follower 543a, the energizing circuit for motor 330 is opened and the drive train is brought to a stop in a position of the cam 332 such as indicated in FIG. 3.

By way of example, the reflecting element on the tape that actuates photocell 303 may be one and one quarter inches long in the direction of tape travel, giving a trigger pulse from photocell 303, FIG. 3, lasting about 0.01 second, when the tape travels 120 inches per second. The electronic switch 542 may be a monostable multivibrator circuit which is actuated to the conductive state by the trigger pulse from photocell 303, and which remains conducting at least until notch 332a is out of register with follower 543a and switch contacts 543, 544 are closed. It the time to complete one revolution of cam 332 is 0.5 second, and if notch 332a has an extent of about 30°, the switch from 542, once triggered, may remain closed a time interval corresponding to at least 30° rotation of cam 332 or at least about 0.042 second. The electronic switch 542 must open in less than 0.5 second in this example so that the motor 330 will be de-energized when cam 332 has made a complete revolution. For a tape speed of 120 inches per second, the tape travels 60 inches during a channel changing interval of 0.5 second, giving a very gradual and unnoticeable transition. If a faster change is desired, the cam speed may be increased and the associated elements adjusted accordingly. If motor 330 and the gear train (including elements 331 and 335) have a substantial lag in response to a trigger pulse from photocell 303, the electric switch 542 is adjusted to provide a correspondingly longer on time to compensate for the lag and insure reliable cycling of the motor 330.

The illustrated embodiment is capable of operation at speeds of 120 inches per second or more, and with scanning of a total of 40 channels on a ¼ inch wide tape without substantial cross-talk.

When the transport mechanism is shifted back to the loading position, microswitch finger 321 is released to de-energize the capstan drive motor, and operating finger 420 is released to cause the application of the brake to the flywheel of the capstan drive assembly 301. Preferably the drag on the tape is released as the carriage 317 is retracted to the loading position so that the movement of the tape is brought to a stop by means of reel brake 92, FIG. 7, at the same time that the capstan is being stopped by means of the capstan brake. A drag is provided on the tape by means of element 96, FIG. 5, cooperating with element 94, FIG. 7. Preferably, the tape drag is substantially released approximately simultaneously with the release of driving engagement between the capstan and the tape. Thus, the drag force on the tape is released generally contemporaneously with the release of engagement between the capstan and the pressure rollers. Preferably, the capstan flywheel brake is operated to essentially stop the capstan during the minimum time required to remove and replace the cartridge relative to the support, so that there would be no possibility of the capstan continuing to rotate at the time a new tape is engaged therewith. Most preferably, the capstan brake operates with sufficient speed so that the capstan will stop rotating approximately the time required for the reel brake 92, FIG. 7, to stop the movement of the magnetic tape, so that the tape of the cartridge can be re-engaged with the capstan after any substantial time interval following the actuation of the transport mechanism to the loading position, after a playing operation.

Once the transport mechanism has been retracted to the loading position, the cartridge 11 may be pivoted upwardly about the lugs at the rear of the support 302 so as to remove the cartridge from the machine.

Referring to FIG. 1, a box-like cover 603 is shown which is fastened by means of screws 604 and 605. The side of cover 603 adjoining the capstan drive assembly 301 is, of course, sufficiently open to accommodate the projection of the capstan pressure rollers to the position such as shown for roller 323 in FIG. 4. The horizontal upper wall of cover 603 is indicated at 603a and is provided with an elongated aperture through which portions of the head indexing assembly project, namely elements 352, 360 and 370, FIG. 4. Thus, main adjustment knob 418 and fine adjustment knob 419 are accessible at the outer side of the cover 603 for convenient manipulation. Also accessible external of the cover 603 are a carriage control lever 610, a record-play control knob 606, a manual-automatic control knob 607, an on-off toggle switch 608 and a repeat-continuous play toggle switch 609. Lamp 618 may be illuminated when the toggle switch 608 is in the on position. A record control button 617 is also shown in FIG. 1. FIG. 3 shows contact 609a controlled by toggle 609 for selectively activating or disabling the automatic indexing circuit.

The carriage control lever 610 is arranged to carry a crank and roller (not shown) which roller is engaged in slot 614, FIG. 4, in a bracket 615 which is fixedly secured to carriage 317. The arrangement is such that when lever 610 is rotated in a clockwise direction as viewed in FIG. 1, the carriage 317 is moved rearwardly to its operating position as shown in FIG. 4 by virtue of the coupling between the lever 610 and the bracket 615. As the carriage is advanced, the capstan pressure rollers project through an aperture in the rear wall of cover 603, opposite to front wall 603d, and the transport is automatically set in motion by means of switch lever 321 (providing switch 608 is in the on position).

Tension spring 319, FIG. 4, has one end secured to the pin 318 and the other end secured to a fixed point of the transport adjacent capstan assembly 301 so that the tension spring resists the movement of the carriage 317 to the operating position. A suitable latch, for example within the cover 603, is provided for releasably retaining the carriage 317 in the operating position. The manual-automatic control 607 is provided with a carriage return button 640 which is reciprocally carried within the main knob portion 641 of the control 607 and is spring urged in the upward direction. When the button 640 is depressed against the action of the spring, the latch is released so as to allow the return spring 319 to return the carriage 317 to the loading position.

The main knob portion 641 has two angular positions, a manual position and an automatic position. In the automatic position the carriage 317 is to be automatically returned to the load position whenever the head assembly 380 returns to the uppermost position in readiness for scanning channel number one on the tape. The control 607 must be shifted to the manual position in order to permit latching of the carriage 317 in the operating position while the head is in scanning relation to channel number one on the tape. Once the head has scanned the first few channels, however, the control 607 may be placed in automatic position if it is desired to stop after scanning of the last channel. Alternatively, a modification permits the control 607 to remain in the automatic position, if desired, as a new scanning operation is initiated. In any case, with the control in the manual position, the transducing operation continues without interruption so that the successive channels are scanned repeatedly until button 640 is actuated.

As will be described in detail hereinafter, the cartridge 11 is provided with tape guide arms 132 and 133 which retain the tape section 25 in the desired loading configuration when the cartridge is removed from the transport mechanism. As the cartridge is pivoted into the operating position, rollers 725 and 726, FIG. 4 serve to actuate slide plates 173 and 174 laterally against the action of spring bias so as to swing the tape guide arms 132 and 133 clear of the tape path as shown in FIG. 7. The details of this arrangement are claimed in a copending application Camras et al U.S. Ser. No. 282,142 filed Aug. 21, 1972, so that it is unnecessary to describe specific details of this mechanism herein, reference being made to said Camras et al application for this information.

The remaining features of the system of FIGS. 1–4 are disclosed in my U.S. Pat. No. 3,849,797, reference being made to such Patnet for a more complete description of the embodiment represented in FIGS. 1–4.

As in the prior application Ser. No. 282,275 will be hereinafter explained in detail, the tape cartridge 11 includes a pivotal tape drag element 94 for exerting a drag force on the tape during transducing operation. As indicated in the seventh figure of my U.S. Pat. No. 3,849,797 a pin 93 is carried on the shiftable carriage for releasing the tape drag as the carriage is retracted to the loading position. A corresponding pin is indicated at 4-93 in FIG. 4.

CARTRIDGE OF FIGS. 5–7

FIG. 5 shows the cartridge 11 separated from the transducer mechanism of FIGS. 1 and 4, but with the top cover 11a removed to reveal the internal construction. Cover 532 of FIG. 2 is shown in position on the cartridge, the cover being shown in horizontal section.

Thus the tape path section is designated by reference numeral 25, the cartridge having a bottom wall with an aperture 156 therein for receiving the capstan drive assembly 301 behind the tape loading path 25. The cartridge is also provided with an opening 11b in front of the loading path 25 for receiving idler rollers 323 and 323' into the cartridge at opposite sides of the capstan drive assembly 301 as illustrated in FIG. 7.

The bottom wall of the cartridge 11 is completely closed except for aperture 29 for receiving photocell 303 and the aperture 156.

A reel brake 92 is disposed within a recess in the bottom wall of the cartridge and cooperates with the peripheral edge of turntable 120 to secure the turntable against rotation when the cartridge is removed from the machine.

A tape drag element 94 is pivotally mounted at 95 within the cartridge and is provided with a felt pad 94a for pressing against the active surface of the magnetic record tape so as to press the inactive surface of the tape against a cooperating surface of fixed guide 96. Reel brake 92 and drag element 94 are shown contained within the cartridge 11, but the drag element 94 could be part of the transport mechanism.

Preferably, the photocell assembly 303 projects into the tape cartridge and carries at its lateral face 98 a photocell exciting lamp and a receiving photocell which is actuated in response to the light respective strip (not shown) applied to the tape when such strip reaches tape the run indicated at 99 in FIG. 7. In the absence of the reflective strip, the tape path section 99 does not reflect sufficient light to the photocell to actuate the photocell circuit.

The reel 120 is mounted for rotation on a central bearing with minimum friction. By way of example, the base plate 122 of the cartridge may have an upstanding bearing post as indicated at 123, and a bearing ball 124 may be interposed between the flat upper face of the bearing post 123, and a conically shaped seat carried by hub portion 125 of reel 120, so that the reel 120 is supported by means of the ball 124 for relatively free rotation on the post 123. An axially elongated sleeve of hub portion 125 closely receives post 123 to maintain the reel in a horizontal condition while freely accommodating rotation thereof.

The hub 125 of the reel 120 is made as light as possible consistent with structural rigidly and includes a central annular portion and an outer hub portion joined by thin radial arms such as indicated at 126. A lower radial flange 127 extends from the lower side of the hub 125 and mounts a coil 128 of record tape wound on the hub 125. The inner end of coil 128 extends over a contoured guide surface 130 formed of a low friction material. The tape engaging portion of the guide 130 is contoured so as to require a minimum distortion in the natural tape path from the inner side of coil 128 to the path between the tape drag elements 94 and 96. The tape after passing between the drag elements 94 and 96 passes about guide pins carried at the free ends of arms 132 and 133 which have fixed pivot points at 95 and 135 respectively. A bias spring (not shown) urges the arms 132 and 133 counterclockwise and clockwise respectively so as to maintain the tape adjacent the wall portions 137 and 138 of the cartridge and thus retain the tape section 25 in a relatively taut condition. From the pin of pivotal guide arm 133, the tape passes about a flanged guide post 140 and past aperture 29, and then about a flanged pin on tensioning arm 143 which is pivotally mounted at 144. From pivot shaft 144, the tape returns and is wound on the outer side of coil 128. A tension spring is indicated at 150 for urging a drag arm 151 in the counterclockwise direction about pivot point 95 so as to urge the movable drag element 94 toward the fixed drag element 96.

Referring to FIG. 5 the spring bias on arms 132 and 133 supplies sufficient tensioning action to the tape so that the tensioning arm 143 is held so as to place its spring under substantial torsion and thus maintain the free loop of the tape under tension. The reel 120 is held against rotation by means of the reel brake 92.

Cam post 4-93, FIG. 4, has a cam face which cooperates with a flange depending from arm 151 so as to release the clamp of drag element 94 when the cartridge is loaded on the tape transport of FIG. 1. The flange on arm 151 is so arranged as to maintain the drag element 94 in released condition until the head carriage reaches approximately 90% of its travel toward the engaged position shown in FIG. 4. The arm 151 is then released so as to allow the tension spring 150 to apply drag force on the tape between elements 94 and 96. Correspondingly, when the head carriage 317 is retracted, the drag force exerted by elements 94 and 96 is released substantially contemporaneously with the release of driving pressure between the tape and the capstan drive assembly 301. When the capstan stops driving, the take up tension of the tape as it winds on the outside of the coasting reel 120 is too low to overcome the drag of elements 94 and 96. Consequently if the drag at elements 94, 96 were not released, the rotation of the reel would supply a slack tape loop in advance of the drag elements 94 and 96 until such time as the coil 128 became too tight to permit further rotation of the reel. The slack loop might jam, while the tightened coil might disturb subsequent normal operation.

To stop the coasting reel smoothly and quickly, the brake 92 comprises a leather brake shoe engageable with the peripheral rim of flange 127. The brake element 92 is carried on an arm 153 which is pivoted on axis 154, and urged in the clockwise braking direction by the action of a wire spring 155. Pin 773, FIG. 4, on carriage 317 serves to release the brake as the carriage is advanced to the operating position.

As previously explained, the bottom wall 122 of the cartridge 11 is provided with an aperture as generally indicated at 156 so as to receive the capstan drive assembly 301 within the tape loop defined by tape sections 164, 25, and 99 as the cartridge is loaded onto the transport 601.

If the engaged position of the transport as indicated in FIG. 7, wire springs 512 and 513, FIG. 4, serve to urge the capstan pressure rollers 323 and 323' against the capstan so as to establish an isolated tape loop extending from an incoming side of the capstan drive 301 to an outgoing side of the capstan drive, the tape drag elements 94 and 96 acting on an incoming tape path section such as indicated at 164, and an outgoing tape path section such as indicated at 165 having essentially zero tension, but being sufficiently guided so as to pass in close proximity to the photocell assembly 303 which carries the lamp and photocell previously referred to. It will be noted that throughout the incoming tape path 164 from the inner side of coil 128 to the incoming side of the capstan drive assembly 310, the tape follows a path having a total amount of bending of substantially less than 90°, and in fact less than 45°, so as to enable a relatively free movement of tape. If the tape had a relatively substantial bend at the incoming path section, this would tend to amplify any flutter which might occur along the incoming path section. The tape drag elements 94 and 96 apply a relatively substantial drag force which in conjunction with the capstan drive assembly 301 provides a tape tension at the transducer head 380 in the range about one to four ounces for a one quarter inch tape.

As seen in FIG. 6, the space between the level of flange 127 of reel 120 and the bottom wall 122 is appreciably less than the width of the tape (indicated at 128), for example 1/16 inch. The reel 120 might be one half to two thirds full where the length of tape was to provide 40 channels with a capacity of one hour of playing time at 120 inches per second. The constant friction supplied by the drag elements 94, 96 tends to swamp out any irregularities in tape motion, for example due to variations in the friction exerted by the coil 128 as the tape is unwound from the inner side thereof, and is important in proper guiding of the tape over the pressure rolls, capstan, and head.

As previously mentioned, a brake is applied to the capstan fly-wheel as soon as the capstan drive 301 is released by retraction of the capstan pressure rollers 323 and 324'. The tape remains somewhat loosely at the capstan when the rollers are retracted, but reengages perfectly if the rollers are brought again to drive position. The tape section 25 is brought to the taut condition shown in FIG. 5 when the carriage is removed from the machine and the arms 132 and 133 return to the loading positions as shown in FIG. 5 under the impetus of their spring bias.

The tape transport carries rollers 725 and 726, FIG. 4, which engage inclined edges of the slide plates 173 and 174, FIG. 5, as the cartridge is pivoted into the operating position. As the cartridge is pressed downwardly into the operating position, the rollers 725 and 726 force the slide plates 173 and 174 laterally against the action of spring bias. A suitable lost motion type linkage couples the slide plates 173 and 174 with the pivot shafts 95 and 135, causing arm 132 to rotate in the clockwise direction, and causing arm 133 to rotate in the counterclockwise direction until the arms reach the operating positions corresponding to the tape scanning mode as shown in FIG. 7. (The arm 151 is freely rotatable relatively to the pivot shaft 95, the pivotal movement of the arm 151 relative to shaft 95 having been previously explained.)

It may be noted that the preferred capstan-head arrangement generally corresponds to that illustrated in the prior Camras applications Ser. No. 44,510 filed June 8, 1970, now U.S. Pat. No. 3,702,906.

Referring to FIG. 7, pivotal loading of the cartridge 11 is accommodated by elements 304–307 carried by means of pads 309 and 310. The pads 309 and 310 have upper surfaces at the same level as the upper surfaces of pads 311 and 312, FIG. 4.

FIG. 6 shows a cross-sectional view of the cartridge 11 with cover plate 720 in position to provide the top wall 11a of the cartridge. The cover 720 is a flat plate of generally rectangular configuration and removably secured to the remainder of the cartridge by means of screws. The cover is provided with a cut-out portion conforming with the contour of aperture 156 so as to receive the capstan drive assembly 301 within the tape loop including tape path section 25 as the cartridge is loaded onto the transport mechanism. The cover is also provided with a notch adjoining the cut-out portion so as to accommodate rollers 725 and 726, FIG. 4. The illustrated cover is further provided with an interiorly opening recess 730 which provides additional clearance for the portion of the tape path indicated at 164 in FIGS. 5 and 7. Also present in the illustrated embodiment is a ring segment 731 secured at the inner side of the cover 720 by means of screws. The ring 731 is made of a plastic material or the like having a smooth under surface 731a which is disposed in close conforming relation to the coil 128 so as to prevent escape of the coil 128 even when the cartridge is inverted. The ring 131 has a gap in the region of the incoming tape path section 164, FIG. 5, and the tape at this section departs from the inner side of coil 128 and passes upwardly and in sliding relation to guide surface 130 of a guide element 735. The element 735 is provided with a smooth under surface 735a which extends in overlying relation to the upper edges of the tape at coil 128, thus serving to retain the tape coil at the region of the gap in the ring 731. The element 735 is fixedly mounted by means of a plate 737 secured by means of a screw 738 to a wall part 739 of cartridge 11.

It will thus be understood that the present invention provides a cartridge adapted for coupling to a stable drive system, the cartridge having no rotating parts except for the tape turntable or reel 120 and requiring no rollers or precision parts that affect the drive accuracy. Thus guide element 735 providing the guide surface 130 is a fixed non-rotating member as are the other parts of the system which engage the tape in the operating mode as shown in FIG. 7. The drive which is accommodated by the cartridge is reliable and relatively free of maintenance requirements, using no belts or pulleys. The capstan drive configuration is such that the head 380 is freely movable from one edge of the tape to the other for scanning relation with a multiplicity of channels on the tape. The cartridge provides a resiliently biased drag element 94 with a pad 94a, FIG. 5, engaging the active surface of the tape for increasing the tape tension above that of the tension which would otherwise be present along the tape path prior to the first engagement of the tape with the capstan drive. By way of example, the cartridge may be of an extremely compact configuration having outside dimensions of about 8½ inches by 7 inches and depth dimension of about ¾ inch. As seen in FIG. 1, for example, the length dimension of the transport mechanism 601 is only slightly greater than the length dimension of the cartridge 11, and the width dimension of the transport mechanism essentially corresponds to the width dimension of the cartridge. The height dimension of the transport mechanism as illustrated in FIG. 1 may be determined essentially by the overall height of the capstan drive motor and capstan drive assembly 301. The electronics except for the conventional circuitry of a broadcast television receiver 710 may all be contained within the housing 601, FIG. 1.

I claim:

1. In an endless loop cartridge transducer system including a capstan drive for pulling tape along the incoming tape path extending from an inner side of a coil of record tape to the capstan drive and for supplying tape to the outer side of said coil along an outgoing tape path extending from the capstan drive and establishing a relatively isolated tape loop adjacent the capstan drive where the tape motion is relatively steady, a transducer head for scanning cooperation with the record tape at said isolated tape loop, and a tape drag for applying a substantial drag force to the tape at said incoming tape path so as to produce a substantial tape tension at the input side of said capstan drive prior to engagement of the tape with said drive.

2. An endless loop cartridge transducer system comprising,
a. a tape transport including a releasable capstan drive having a capstan, and having a pair of capstan pressure rollers at opposite sides of the capstan for engaging a record tape with the capstan at the opposite sides thereof to establish an isolated tape loop extending from an incoming side of the capstan drive to an outgoing side thereof,
b. a rotatable reel carrying a coil of record tape, for supplying the record tape to the incoming side of said capstan drive from the inner side of the coil and for winding the record tape onto the outer side of the coil as it is supplied thereto from the outgoing side of said capstan drive, c. a transducer head for scanning relation to said isolated tape loop, d. a tape guide structure defining an incoming tape path section during transducing operation extending from the inner side of the coil to the incoming side of said capstan drive, and e. a releasable tape drag device having parts at opposite sides of the incoming tape path section which are relatively movable for applying a substantial clamping pressure to the record tape at said incoming tape path section, said tape drag device during transducer operation being operable to apply a tape drag force in advance of said isolated tape loop for controlling the tension of the record tape as it enters into engagement with said capstan drive at said incoming side thereof.

3. A transducer system according to claim 2 with actuating means coupled with said releasable tape drag device and with said releasable capstan drive for accommodating operation of said tape drag device to produce a substantial tape tension on the record tape between said tape drag device and said capstan drive during engagement of the capstan drive with the record tape, for moving the record tape along said incoming tape path section and in scanning relation to said transducer head during a transducing operation, and said actuating means being operable to effect release of the clamping pressure exerted by the tape drag device contemporaneously with the release of said capstan drive to substantially remove constraining forces on the length of record tape extending along the incoming tape path section whereby the momentum of said reel serves to continue the movement of the record tape during the time the capstan drive is being released thereby to accommodate a smooth stopping action with continued winding of the record tape on the reel in spite of relatively high record speeds during a transducing operation.

4. A transducer system according to claim 3 with said capstan drive being operable to move the record tape at a speed of at least 30 inches per second, and said tape drag device being effective during transducing operation to produce a substantial tension at said incoming tape path section where the record tape enters engagement with the capstan drive of from about 1 to about 4 ounces per ¼ inch of tape width.

5. A transducer system in accordance with claim 3 said capstan drive being operable to move said record tape at a speed of the order of 120 inches per second, and means controlled by said actuating means for bringing the record tape substantially to rest and for decelerating the capstan drive to substantially a stopped condition during the minimum time required to remove and replace the reel.

6. In a transducer system in accordance with claim 2 with said capstan drive being effective to cause said capstan pressure rolls to engage the record tape with the capstan during transducing operation and to releasing the record tape from the capstan in a retracted position, said capstan drive being operable to drive the record tape at a speed of at least 30 inches per second, and actuating means operable to release the drag force of said tape drag device generally contemporaneously with the release of engagement between the capstan and the pressure rollers.

7. In an endless loop tape transducer system, a. a tape transport including capstan drive means releasably engageable with a record tape at an incoming side of drive means and at an outgoing side of said capstan drive means to establish an isolated tape loop therebetween, and a cartridge support, b. a transducer head for scanning relation to a record tape at said isolated tape loop between said incoming side and said outgoing side of said capstan drive means for carrying out a signal transducing operation with respect to a record tape, c. an endless loop cartridge releasably mounted on said cartridge support and including a rotatably mounted reel having a coil of record tape thereon, said cartridge having an incoming tape path section extending from the inner side of said coil to the incoming side of said capstan drive means for supplying the record tape to the capstan drive means during a transducing operation, and having an output tape path section leading to the outer side of said coil for receiving the record tape from the outgoing side of said capstan drive means and for supplying the record tape to the outer side of said coil during a transducing operation, and d. a tape drag device disposed adjacent the incoming tape path section and operable during a transducing operation to exert a drag force on the record tape of substantial magnitude such as to produce a substantial tape tension at the incoming side of said capstan drive means, e. said capstan drive means being operable to drive said record tape at a speed of at least 30 inches per second during such a transducing operation.

8. A transducer system in accordance with claim 7, with said tape drag device having parts thereof at opposite sides of the incoming tape path section and operable for releasably exerting a clamping pressure on the record tape therebetween, and a reel brake engageable directly with the reel of the endless loop cartridge, actuating means coupled with said capstan drive means, said tape drag device and said reel brake for engaging the capstan drive means with the record tape at said incoming side and at said outgoing side thereof to drive the record tape at said speed of at least about 30 inches per second, for accommodating operation of said tape drag device to exert said clamping pressure and thus to produce said substantial tape tension at the incoming side of said capstan drive means, and for releasing said reel brake during a transducing operation, said actuating means being shiftable to a release condition to contemporaneously release the driving engagement between the capstan drive means and the record tape, and the clamping pressure exerted by the tape drag device, and to actuate the reel brake to braking condition, thus to stop the coasting reel smoothly without exerting a braking force directly on the record tape.

9. The method of controlling motion of an endless loop record tape which includes a coil carried on a low friction rotatable turntable, said method comprising engaging the record tape by means of a capstan drive to move the record tape at a longitudinal scan video transducing speed past a transducer head, applying a substantial drag force to the record tape between the coil thereof and the capstan drive and entirely in advance of said capstan drive contacting the record tape, during transducing operation and thereby producing a substantially constant frictional force resisting tape motion and sufficient to substantially swamp out any irregularities in tape motion at the transducer head, and releasing said drag force and applying a braking force directly to the turntable whenever the capstan drive is released to bring the record tape to a stop.

* * * * *